United States Patent
Klenk et al.

(10) Patent No.: US 12,309,070 B2
(45) Date of Patent: May 20, 2025

(54) IN-NETWORK MESSAGE AGGREGATION FOR EFFICIENT SMALL MESSAGE TRANSPORT

(71) Applicant: NVIDIA Corporation, Santa Clara, CA (US)

(72) Inventors: Benjamin Klenk, San Jose, CA (US); Alan Lynn Davis, Coalville, UT (US); Larry Robert Dennison, Mendon, MA (US)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 18/149,924

(22) Filed: Jan. 4, 2023

(65) Prior Publication Data

US 2023/0327996 A1    Oct. 12, 2023

Related U.S. Application Data

(60) Provisional application No. 63/328,619, filed on Apr. 7, 2022.

(51) Int. Cl.
  *G06F 15/173* (2006.01)
  *H04L 47/2441* (2022.01)
(52) U.S. Cl.
  CPC ............... *H04L 47/2441* (2013.01)
(58) Field of Classification Search
  CPC .................................................. H04L 47/2441
  USPC ....................................................... 709/238
  See application file for complete search history.

(56) References Cited

U.S. PATENT DOCUMENTS

| | | |
|---|---|---|
| 6,370,502 B1 | 4/2002 | Wu et al. |
| 6,438,137 B1 | 8/2002 | Turner |
| 6,483,804 B1 | 11/2002 | Muller et al. |
| 6,507,562 B1 | 1/2003 | Kadansky et al. |
| 6,728,862 B1 | 4/2004 | Wilson |
| 6,857,004 B1 | 2/2005 | Howard et al. |
| 6,937,576 B1 | 8/2005 | Di Benedetto et al. |
| 7,079,501 B2 * | 7/2006 | Boivie .................... H04L 45/00 370/338 |

(Continued)

OTHER PUBLICATIONS

Maley, F.M., et al., "Conveyors for Streaming Many to Many Communication," IEEE/ACM 9th Workshop on Irregular Applications: Architectures and Algorithms (IA3), 2019.

(Continued)

*Primary Examiner* — Vivek Srivastava
*Assistant Examiner* — Karina J Garcia-Ching
(74) *Attorney, Agent, or Firm* — Leydig, Voit & Mayer, Ltd.

(57) ABSTRACT

Aggregation of small payloads from multiple packets may improve bandwidth efficiency of a network, particularly a high-performance compute cluster with thousands of network endpoints and distributed data. Aggregation is context-based and a packet header is reduced because the common components that are shared by the aggregated messages are included once within the header. Execution contexts are explicitly created and destroyed by application programs. Each participating endpoint stores context-specific properties until the context is destroyed, so that the properties are not included in the header. Aggregation may be performed at different hierarchical levels by switches and/or endpoints.

21 Claims, 11 Drawing Sheets

(56) References Cited

U.S. PATENT DOCUMENTS

| | | |
|---|---|---|
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,738,443 B2 | 6/2010 | Kumar |
| 7,760,743 B2 | 7/2010 | Shokri et al. |
| 8,213,315 B2 | 7/2012 | Crupnicoff et al. |
| 8,255,475 B2 | 8/2012 | Kagan et al. |
| 8,380,880 B2 | 2/2013 | Gulley et al. |
| 8,510,366 B1 | 8/2013 | Anderson et al. |
| 8,645,663 B2 | 2/2014 | Kagan et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,775,698 B2 | 7/2014 | Archer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,456,060 B2 | 9/2016 | Pope et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,158,702 B2 | 12/2018 | Bloch et al. |
| 10,284,383 B2 | 5/2019 | Bloch et al. |
| 10,296,351 B1 | 5/2019 | Kohn et al. |
| 10,305,980 B1 | 5/2019 | Gonzales et al. |
| 10,318,306 B1 | 6/2019 | Kohn et al. |
| 10,425,350 B1 | 9/2019 | Florissi |
| 10,521,283 B2 | 12/2019 | Shuler et al. |
| 10,528,518 B2 | 1/2020 | Graham et al. |
| 10,541,938 B1 | 1/2020 | Timmerman et al. |
| 10,547,553 B2 | 1/2020 | Shattah et al. |
| 10,621,489 B2 | 4/2020 | Appuswamy et al. |
| 11,088,971 B2 | 8/2021 | Brody et al. |
| 11,750,699 B2 | 9/2023 | Graham et al. |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2002/0165897 A1 | 11/2002 | Kagan et al. |
| 2002/0196787 A1* | 12/2002 | Rajan ............... H04L 49/3009 370/473 |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2003/0120835 A1 | 6/2003 | Kale et al. |
| 2003/0198226 A1* | 10/2003 | Westberg ............ H04L 49/602 370/393 |
| 2004/0030745 A1 | 2/2004 | Boucher et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0223118 A1 | 10/2005 | Tucker et al. |
| 2005/0281287 A1 | 12/2005 | Ninomi et al. |
| 2006/0104303 A1* | 5/2006 | Makineni ............ H04L 69/161 370/463 |
| 2006/0282838 A1 | 12/2006 | Gupta et al. |
| 2007/0127396 A1 | 6/2007 | Jain et al. |
| 2007/0127525 A1 | 6/2007 | Sarangam et al. |
| 2007/0162236 A1 | 7/2007 | Lamblin et al. |
| 2008/0040792 A1 | 2/2008 | Larson |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0219159 A1 | 9/2008 | Chateau et al. |
| 2008/0244220 A1 | 10/2008 | Lin et al. |
| 2008/0263329 A1 | 10/2008 | Archer et al. |
| 2008/0028891 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0240838 A1 | 9/2009 | Berg et al. |
| 2009/0247241 A1 | 10/2009 | Gollnick et al. |
| 2009/0292905 A1 | 11/2009 | Faraj |
| 2009/0296699 A1 | 12/2009 | Hefty |
| 2009/0327444 A1 | 12/2009 | Archer et al. |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0250756 A1 | 9/2013 | Johri |
| 2013/0312011 A1 | 11/2013 | Kumar et al. |
| 2013/0318525 A1 | 11/2013 | Palanisamy et al. |
| 2013/0336292 A1 | 12/2013 | Kore et al. |
| 2014/0019574 A1 | 1/2014 | Cardona |
| 2014/0033217 A1 | 1/2014 | Vajda et al. |
| 2014/0040542 A1 | 2/2014 | Kim et al. |
| 2014/0047341 A1 | 2/2014 | Breternitz et al. |
| 2014/0095779 A1 | 4/2014 | Forsyth et al. |
| 2014/0122831 A1 | 5/2014 | Uliel et al. |
| 2014/0136811 A1 | 5/2014 | Fleischer et al. |
| 2014/0189308 A1 | 7/2014 | Hughes et al. |
| 2014/0211804 A1 | 7/2014 | Makikeni et al. |
| 2014/0258438 A1 | 9/2014 | Ayoub |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |

(56) References Cited

U.S. PATENT DOCUMENTS

| | | |
|---|---|---|
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1 | 7/2015 | Archer et al. |
| 2015/0212972 A1 | 7/2015 | Boettcher et al. |
| 2015/0261720 A1 | 9/2015 | Kagan et al. |
| 2015/0269116 A1 | 9/2015 | Raikin |
| 2015/0278347 A1 | 10/2015 | Meyer et al. |
| 2015/0347012 A1 | 12/2015 | Dewitt et al. |
| 2015/0365494 A1 | 12/2015 | Cardona |
| 2015/0379022 A1 | 12/2015 | Puig et al. |
| 2016/0055225 A1 | 2/2016 | Xu et al. |
| 2016/0092362 A1 | 3/2016 | Barron |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0248656 A1 | 8/2016 | Anand et al. |
| 2016/0283422 A1 | 9/2016 | Crupnicoff et al. |
| 2016/0294793 A1 | 10/2016 | Larson |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt |
| 2016/0364350 A1 | 12/2016 | Sanghi et al. |
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192782 A1 | 7/2017 | Valentine et al. |
| 2017/0199844 A1 | 7/2017 | Burchard et al. |
| 2017/0255501 A1 | 9/2017 | Shuler |
| 2017/0308329 A1 | 10/2017 | A et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0115529 A1 | 4/2018 | Munger |
| 2018/0173673 A1 | 6/2018 | Daglis et al. |
| 2018/0262551 A1 | 9/2018 | Demeyer et al. |
| 2018/0278549 A1 | 9/2018 | Mula |
| 2018/0285316 A1 | 10/2018 | Thorson et al. |
| 2018/0287928 A1 | 10/2018 | Levi et al. |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0349212 A1 | 12/2018 | Liu et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044889 A1 | 2/2019 | Serres |
| 2019/0065208 A1 | 2/2019 | Liu et al. |
| 2019/0068501 A1 | 2/2019 | Schneder et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1 | 4/2019 | Knowles et al. |
| 2019/0138638 A1 | 5/2019 | Pal et al. |
| 2019/0141133 A1 | 5/2019 | Rajan |
| 2019/0147092 A1 | 5/2019 | Pal et al. |
| 2019/0149486 A1 | 5/2019 | Bohrer et al. |
| 2019/0149488 A1 | 5/2019 | Bansal |
| 2019/0171612 A1 | 6/2019 | Shahar |
| 2019/0235866 A1 | 8/2019 | Das Sarma et al. |
| 2019/0278737 A1 | 9/2019 | Kozomora |
| 2019/0303168 A1 | 10/2019 | Flemming, Jr. et al. |
| 2019/0303263 A1 | 10/2019 | Flemming, Jr. et al. |
| 2019/0324431 A1 | 10/2019 | Celia et al. |
| 2019/0339688 A1 | 11/2019 | Celia et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak et al. |
| 2020/0103894 A1 | 4/2020 | Celia et al. |
| 2020/0106828 A1 | 4/2020 | Elias et al. |
| 2020/0137013 A1 | 4/2020 | Jin et al. |
| 2020/0265043 A1 | 8/2020 | Graham et al. |
| 2020/0274733 A1 | 8/2020 | Graham et al. |
| 2021/0203621 A1 | 7/2021 | Ylisirnio |
| 2021/0311774 A1* | 10/2021 | Wei ..................... G06F 11/3006 |
| 2021/0373972 A1* | 12/2021 | Kurkure ................ G06F 9/5044 |

OTHER PUBLICATIONS

Ghosh, S., et al., "TriC: Distributed-memory Triangle Counting by Exploiting the Graph Structure," 2020 IEEE High Performance Extreme Computing Conference (HPEC), 2020.

Von Eichen, T., et al., "Active messages: a mechanism for integrated communication and computation," Proceedings of the 19th Annual International Symposium on Computer Architecture (ISCA'92), 1992.

Mellanox Technologies Inc., "Scaling IOGb/s Clustering at Wire-Speed", pp. 1-8, year 2006.

IEEE 802. ID Standard "IEEE Standard for Local and Metropolitan Area Networks-Media Access Control (MAC) Bridges", IEEE Computer Society, pp. 1-281, Jun. 9, 2004.

Turner et al., "Multirate Clos Networks", IEEE Communications Magazine, pp. 1-11, Oct. 2003.

MPI: A Message-Passing Interface Standard, Message Passing Interface Forum, version 3.1, pp. 1-868, Jun. 4, 2015.

Coti et al., "MPI Applications on Grids: a Topology-Aware Approach," Proceedings of the 15th International European Conference on Parallel and Distributed Computing (EuroPar'09), pp. 21, 2008.

Petrini et al., "The Quadrics Network (QsNet): High-Performance Clustering Technology," Proceedings of the 9th IEEE Symposium on Hot Interconnects (Hot!'01), pp. 1-6, Aug. 2001.

Sancho et al., "Efficient Offloading of Collective Communications in Large-Scale Systems," Proceedings of the 2007 IEEE International Conference on Cluster Computing, pp. 1-10, Sep. 17-20, 2007.

"InfiniBand Architecture Specification, vol. 1," Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Gainaru et al., "Using InfiniBand Hardware Gather-Scatter Capabilities to Optimize MPI All-to-All", EuroMPI '16, Edinburgh, United Kingdom, pp. 1-13, year 2016.

Pjesivac-Grbovic et al., "Performance analysis of MPI collective operations", Cluster Computing, pp. 1-25, 2007.

Chiang et al., "Toward supporting data parallel programming on clusters of symmetric multiprocessors", Proceedings International Conference on Parallel and Distributed Systems, pp. 607-614, Dec. 14, 1998.

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

(56) References Cited

OTHER PUBLICATIONS

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using parameterized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

Wikipedia, "Loop unrolling," pp. 1-9, last edited Sep. 9, 2020 downloaded from https://en.wikipedia.org/wiki/Loop_unrolling.

Chapman et al., "Introducing OpenSHMEM SHMEM for the PGAS Community," Partitioned Global Address Space Conference 2010, University of Houston, Oak Ridge National Laboratory & U.S. Department of Defense, pp. 1-3, Oct. 2010.

Priest et al., "You've Got Mail (YGM): Building Missing Asynchronous Communication Primitives", IEEE International Parallel and Distributed Processing Symposium Workshops, pp. 221-230, year 2019.

Wikipedia, "Nagle's algorithm", pp. 1-4, Dec. 12, 2019.

Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.

"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.

Pacheco, "A User's Guide to MPI," Department of Mathematics, University of San Francisco, CA, USA, pp. 1-51, Mar. 30, 1998.

Wikipedia, "Message Passing Interface," pp. 1-16, last edited Nov. 7, 2021, as downloaded from https://en.wikipedia.org/wiki/Message_Passing_Interface.

\* cited by examiner

IN-NETWORK MESSAGE AGGREGATION FOR EFFICIENT SMALL MESSAGE TRANSPORT

CLAIM OF PRIORITY

This application claims the benefit of U.S. Provisional Application No. 63/328,619 titled "In-Network Message Aggregation for Efficient Small Message Transport," filed Apr. 7, 2022, the entire contents of which is incorporated herein by reference.

BACKGROUND

When a high-speed, high-bandwidth, packet switched network load is dominated by packets with small payloads (messages) the bandwidth efficiency decreases and message processing rate plateaus at a maximum, limiting performance. The bandwidth efficiency of a packet is defined as the size of the payload in bytes divided by the total size of the packet in bytes. The packet includes the payload and header and trailer fields. Header fields describe components such as destination address, source address, packet type, packet length, flow identifier, time to live, packet sequence number, etc. These additional header fields are necessary so that the network switches can determine how to parse and route the packet properly. Trailer packet fields are necessary for error detection and/or correction purposes in order to improve network reliability.

Another issue with small messages is that network processing hardware usually requires several cycles to parse, interpret, and route the packet. If the payload is small, the processing hardware simply cannot keep up and the effective message rate and bandwidth utilization will be reduced. There is a need for addressing these issues and/or other issues associated with the prior art.

SUMMARY

Embodiments of the present disclosure relate to in-network message aggregation for efficient small message transport. Systems and methods are disclosed that aggregate multiple small payloads into a packet with a common (shared) header. Aggregation of the small payloads may improve bandwidth efficiency of a network, particularly a high-performance compute cluster with thousands of network endpoints and distributed data.

Conventional solutions operate where packets enter or exit the network (ingress and egress points) to aggregate payloads having the same destination into a larger packet payload with a shared header. In contrast, the in-network message aggregation does not limit aggregation to network ingress and egress points. For example, switches provide in-network message aggregation. Aggregation is context-based and the context is a reference to shared properties which are held at the endpoints and not included in the header. The header is effectively compressed because the common components that are shared by the aggregated messages need only be included once within the header. Execution contexts are explicitly created and destroyed by application programs. Upon creation, a context ID and context properties (e.g., properties of packets, response requirements, and notification mechanisms) are sent from the source endpoint to at least one of the participating endpoints. The participating endpoint(s) store the context properties for the context ID until the context is destroyed. Thus, the header is compressed by virtue of being shared for multiple payloads and because the context properties are stored at the destination and are therefore provided by including only the context ID in the header. In an embodiment, an aggregated packet comprises at least one payload, the context ID, and the destination. In the context of the following description, the term payload is equivalent to message.

In an embodiment, the method includes identifying messages that share a context created by a source application program and aggregating the identified messages for inclusion in a single packet. The single packet is constructed using the aggregated identified messages and an identifier for the context and the single packet is transmitted within a network. In an embodiment, packets sourced from multiple sources and multiple packets from a single source can be aggregated if the context is the same.

In an embodiment, a method is implemented for operation of a device connected to a network, where a plurality of source endpoints and a plurality of destination endpoints are coupled to the network, and where a message includes a payload that is associated with a context of one or more contexts created by a source application program. In an embodiment, the method comprises identifying messages that share a first context, aggregating into a packet the identified messages and a context identifier corresponding to the first context, and transmitting the packet through the network to at least one of the destination endpoints.

BRIEF DESCRIPTION OF THE DRAWINGS

The present systems and methods for in-network message aggregation for efficient small message transport are described in detail below with reference to the attached drawing figures, wherein.

DETAILED DESCRIPTION

Figure 1A:
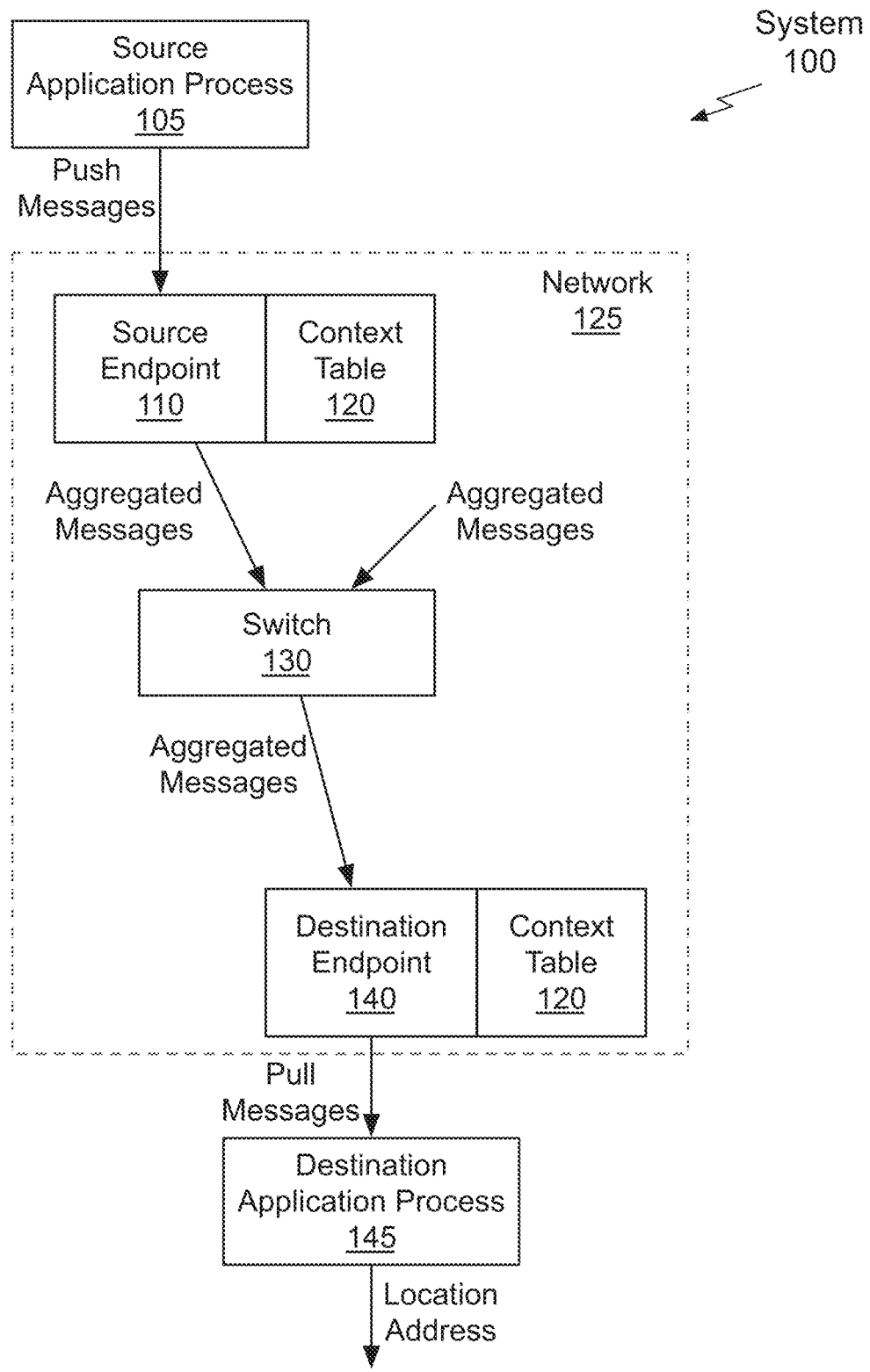
FIG. 1A is a conceptual diagram illustrating message aggregation and transport suitable for use in implementing some embodiments of the present disclosure.

With every network there exists a minimum packet size at which the network can be considered efficient. Small messages pose several problems when application performance is bandwidth limited. First, the hardware has a message rate limit and if packets (or messages) are small there is little time to process the headers and the processing rate limits the effective bandwidth. Second, the effective bandwidth on a connection or wire is simply given by the ratio between payload and overhead, namely headers and trailers. Packets with small payloads are dominated by their overhead. Third, small payloads result in poor utilization of wide internal datapaths.

Small payload bandwidth inefficiency is a widely acknowledged problem and one that has been addressed in various ways. Application programmers have long known about the low efficiency of small messages and usually implement some form of message aggregation in software (SW). For example, software and/or hardware may support frame aggregation as part of the 802.11e, 802.11n, and 802.11ac wireless standards, and the older MoCA (Multi-Media over Coax Alliance) standard. These ethernet protocols allow two types of frame aggregation. MAC service data unit (MSDU) aggregates when multiple packets have the same source and destination address. MAC protocol data unit (MPDU) combines ethernet frames going to a single destination and encapsulates the aggregated packet into an 802.11n MAC header. In contrast with software aggregation, the in-network aggregation technique moves the aggregation to hardware, particularly the network switches.

The main difference between previous work and the in-network aggregation technique is that previous efforts have performed the aggregation task in the network software stack, at the application level, or in the endpoint NIC. Conventional aggregation at an endpoint NIC, aggregates messages having the same destination endpoint. In contrast, in-network aggregation supports a context concept which allows the header to include a shared context identifier that is a compressed reference to message properties and the approach allows aggregation at the endpoints as well as in the network switches. In an embodiment, aggregation is not limited to messages sharing the same destination endpoint, but may also be performed for messages sharing the same next hop (e.g., egress port of a switch). Aggregating small messages in switches enables sharing of headers among multiple messages that form a packet, resulting in very high efficiencies for messages as small as 8-bytes. Note that the in-network aggregation approach tackles both the message rate and the insufficient bandwidth problems.

A context is a stateful descriptor that applies to a subset of the messages sent between communicating processes within a collective. One or more of the communicating processes reside on a network endpoint (e.g., a computing element such as a CPU or GPU, or a NIC to a computing element). A context ID is included in the packet header and specifies a variety of properties that apply to the message. Some of the properties are endpoint specific, such as the number of processes in the collective, the location and types of buffers or queues where the message will be stored on the receiver side. Other context properties are network agnostic but allow the receiving endpoint to interpret the packet payload correctly. The properties specify attributes associated with reliability, ordering, atomicity, data type, etc. A context is collectively set up in a synchronized (blocking) fashion by each of the collective's (participating) endpoints. The use of a context ID reduces the size of the packet header since it serves as a shorthand proxy for the network agnostic properties. Contexts are explicitly set up and torn down. The context ID serves as an index into context property tables that are held at each endpoint participating in the context. In an embodiment, context property tables are stored in switches. In an embodiment, only messages with the same context can be aggregated.

FIG. 1A is a conceptual diagram illustrating a message aggregation and transport system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the system 100 is within the scope and spirit of embodiments of the present disclosure. In an embodiment, one or more operations of the system 100 are implemented by any combination of a graphics processing unit (GPU) graphics pipeline, GPU general computation cores, or on a central processing unit (CPU).

A source application process 105 creates a context and transmits the context properties to context tables 120 associated with one or more participating destination endpoints including a destination endpoint 140. As shown in FIG. 1A, the source application process 105 pushes messages into a network 125 for transmission to the destination endpoint 140 associated with a destination application process 145. A source endpoint 110 aggregates the pushed messages that share a common context and encodes a context identifier (ID) with the aggregated messages to construct a packet that is transmitted towards the destination endpoint 140. The source application process 105 and the destination application process 145 may be processes that belong to the same application or collective. The aggregated messages are transmitted as packets from the source endpoint 110 to a switch 130. The switch 130 may receive packets from multiple source endpoints 110 (and other switches 130) and directs each packet towards the destination endpoint that is encoded in the packet header. In an embodiment, the switch 130 is ignorant of the context properties.

The destination endpoint 140 retrieves the context properties from the context table 120 using the context ID that is encoded in the packet. The destination application process 145 then pulls the message(s) from the destination endpoint 140. In an embodiment, the destination endpoint 140 provides the message(s) to the destination application process 145. In an embodiment, one or more of the messages aggregated into a single packet share a context but specify different destination endpoints. The switch 130 separates the single packet into two or more packets, as needed to transmit the messages to the specified destination endpoints. The switch 130 may aggregate the separated messages with other messages that share the same context and destination endpoint (or waypoint towards the destination endpoint). The destination endpoint 140 may return messages to separate destination application processes 145 according to a process identifier associated with each message.

In the context of the following description, the term network comprises devices such as endpoints, switches, and links. The term network endpoint is the point where packets enter the network (ingress) or exit the network (egress). Network (source or destination) endpoints may be a CPU, GPU, or some sort of network interface device or network interface card (NIC). In the context of the following description, the NIC is considered as part of the network endpoint.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
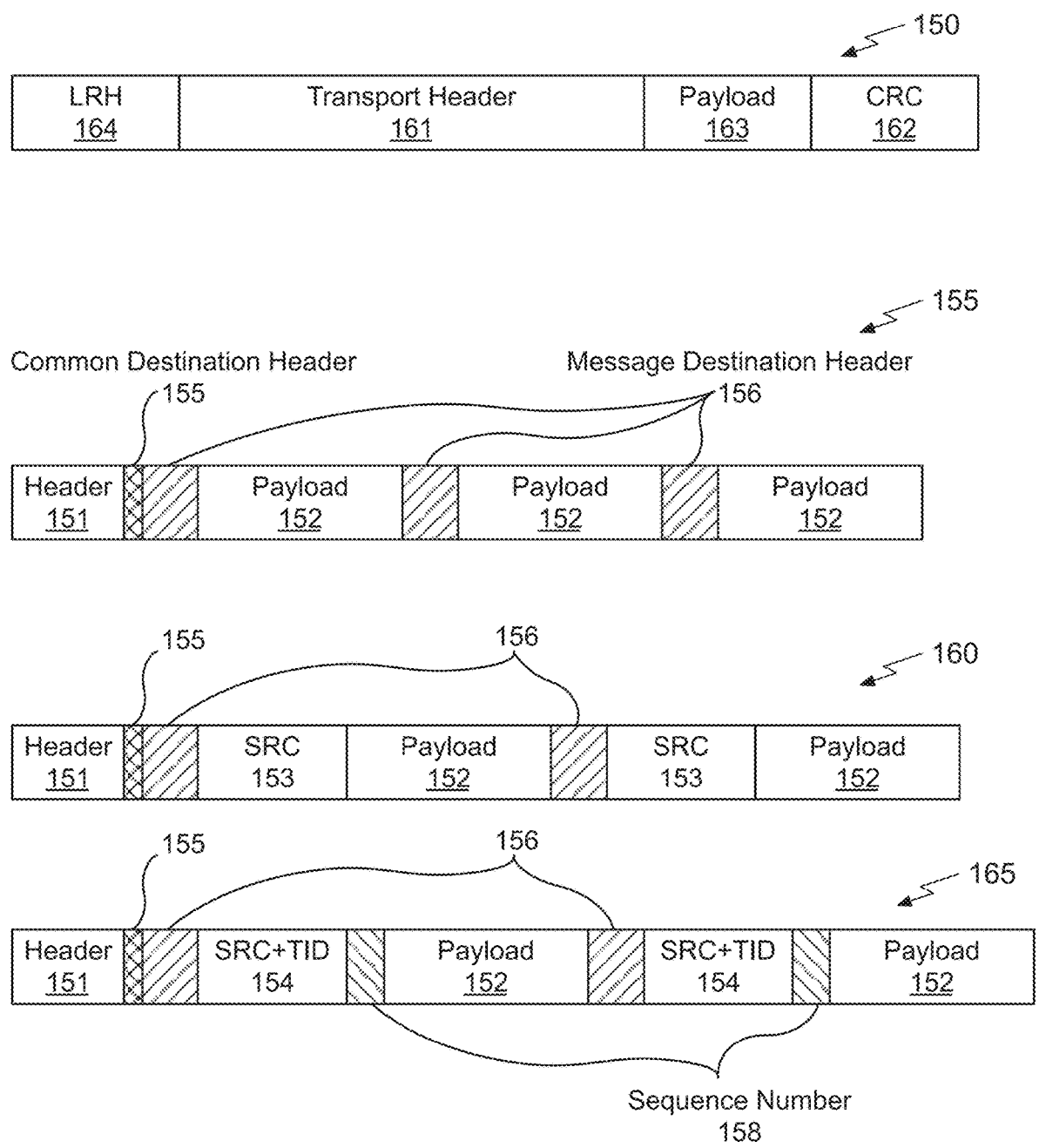
FIG. 1B illustrates packet formats for aggregated messages suitable for use in implementing some embodiments of the present disclosure.

FIG. 1B illustrates packet formats 155, 160, and 165 for aggregated messages suitable for use in implementing some embodiments of the present disclosure. A typical InfiniBand packet format 150 is illustrated for comparison purposes and includes an 8-byte local routing header (LRH) 164, 48-byte transport header 161, 8-byte payload 163, and an 8-byte cyclic redundancy check (CRC) 162. The transport header 161 includes information needed for packet processing, such as parsing, interpreting, routing, and validation. For 8-byte payloads, the efficiency of the conventional packet format 150 is 11%.

The packet formats 155, 160, and 165 are for the aggregated messages for the same context and with 8-byte payloads. The packet format 155 includes a header 151, a common destination header 155, multiple payloads 152, and a message destination header 156 for each one of the payloads 152. In an embodiment, the header 151, common destination header 155, message destination header 156, and payload 152 are 8-bytes, 1-byte, 2-bytes, and 8-bytes, respectively. For in-network aggregation, the destination header may be encoded to include a common portion shared by all aggregated messages within the packet 155 and message-specific portions, where each payload 152 is a message. The common portion is shown as the common destination header 155 and the message-specific portion is the message destination header 156.

In an embodiment, messages having the same context may be aggregated. In an embodiment, messages sharing the same context have the same payload type, size, and data structure. Common header information that is irrelevant to the network 100 is embedded into aggregation-specific contexts which are pre-configured and stored in the context tables 120. A context identifier is included in the header 151 and functions as a compressed alias for the header information stored in the context tables 120. The common destination header 155 may include an address of the destination (e.g., a switch ID, node ID, and process ID). At each switch 130, the switch ID and the node ID may be provided to a routing function that returns an egress port associated with each message, so each message may be routed to a different egress port of the switch. Messages that are routed to the same egress port are aggregated into a single packet. At the egress port, packets received from different ingress ports may be aggregated. In an embodiment, for each egress port, packets for different contexts are stored in separate buffers and are aggregated into separate packets (even when they have the same destination). Aggregation logic is incorporated into the switches and network endpoints to extract messages from the packets received at each ingress port and separately aggregate messages routed to each one of the egress ports.

In an embodiment, the routing portion of the header 151 (destination endpoint address) is divided into a hierarchy of clusters, groups, nodes, and processes. In other words, the destination endpoint address may be hierarchical so that groups of destination endpoints that are fully interconnected are first routed to a shared cluster, then to the particular destination endpoint, and then to the specific core or process. A group is one dimension in a hierarchy and comprises a number of endpoints. For example, a leaf switch represents one group in a two-level Fat-Tree. In an embodiment, every endpoint process has an address <group> <node> <process>. Messages that travel together within a hierarchy level share the appropriate portion of the routing header 151. For example, if all messages travel to the same leaf switch, each message destination header 156 includes a node and process identifier and the common destination header 155 includes the group. The small message exchange may be viewed as a collective operation that starts with the initialization of a context. The context tables 120 at the source and destination endpoints participating in a collective are populated and packets carry a context ID. When a packet is received at an endpoint, context properties are retrieved from the context table 120. Compared with the header 161, the header 151 is small because the context properties do not need to travel with the packet.

The packet format 160 includes a header 151, a common destination header 155, multiple payloads 152, and each of a message destination header 156 and a source identifier (SRC) 153 for each one of the payloads 152. Both of the packet formats 155 and 160 are unordered. While the packet format 155 is unreliable, the packet format 160 is reliable because the SRC 153 is included. The SRC 153 is overhead that is incurred for reliable transport. Specifically, the SRC 153 is needed to request retransmission if the payload is contaminated (as indicated by an error correction code). In an embodiment, the SRC 153 is 7-bytes. In an embodiment, the messages are delivered at most once because lost messages are not retransmitted. Reliability and/or ordering may be supported at the expense of bandwidth. The larger packet format 165 is both ordered and reliable, with a source identifier and transaction identifier (SID+TID) 154 and a sequence number 158 included for each payload 152. In an embodiment, the sequence number 158 is omitted and the destination endpoint 140 establishes the ordering using the TID. Supporting a variety of packet formats allows programmers to choose primitives that fit their application. If applications require retransmission for reliability, exactly-once delivery for atomics, or ordering of a sequence of messages, a programmer or hardware mechanisms (e.g., a NIC) can use a packet format that satisfies their requirements or explicitly add the necessary hardware or software mechanisms.

The wire efficiency of in-network packet format 155, assuming 16 8-byte messages are aggregated in each packet, is 75%. The wire efficiency of the reliable in-network packet format 160, assuming 16 8-byte messages are aggregated in each packet, is 58%. The wire efficiency of the reliable and ordered in-network packet format 160, assuming 16 8-byte messages are aggregated in each packet, is 51%. For small packet sizes, the aggregated packet formats 155, 160, and 165 with a common header portion and message-specific header portions provide improved wire efficiencies for transmitting small messages compared with conventional packet formats, such as the 11% efficiency of the conventional packet format 150.

An additional advantage of the in-network aggregation is that the aggregation logic is built into the switches 130. The aggregation logic is divided into ingress processing and egress processing. Because the source endpoints 110 may aggregate messages, packets arriving at a switch 130 may contain multiple messages, which are extracted at ingress. Once messages are extracted, each of the messages is routed by determining the egress port. Messages routed to the same egress port may be aggregated and packets are constructed for transmission that include the aggregated messages.

Figure 2A:
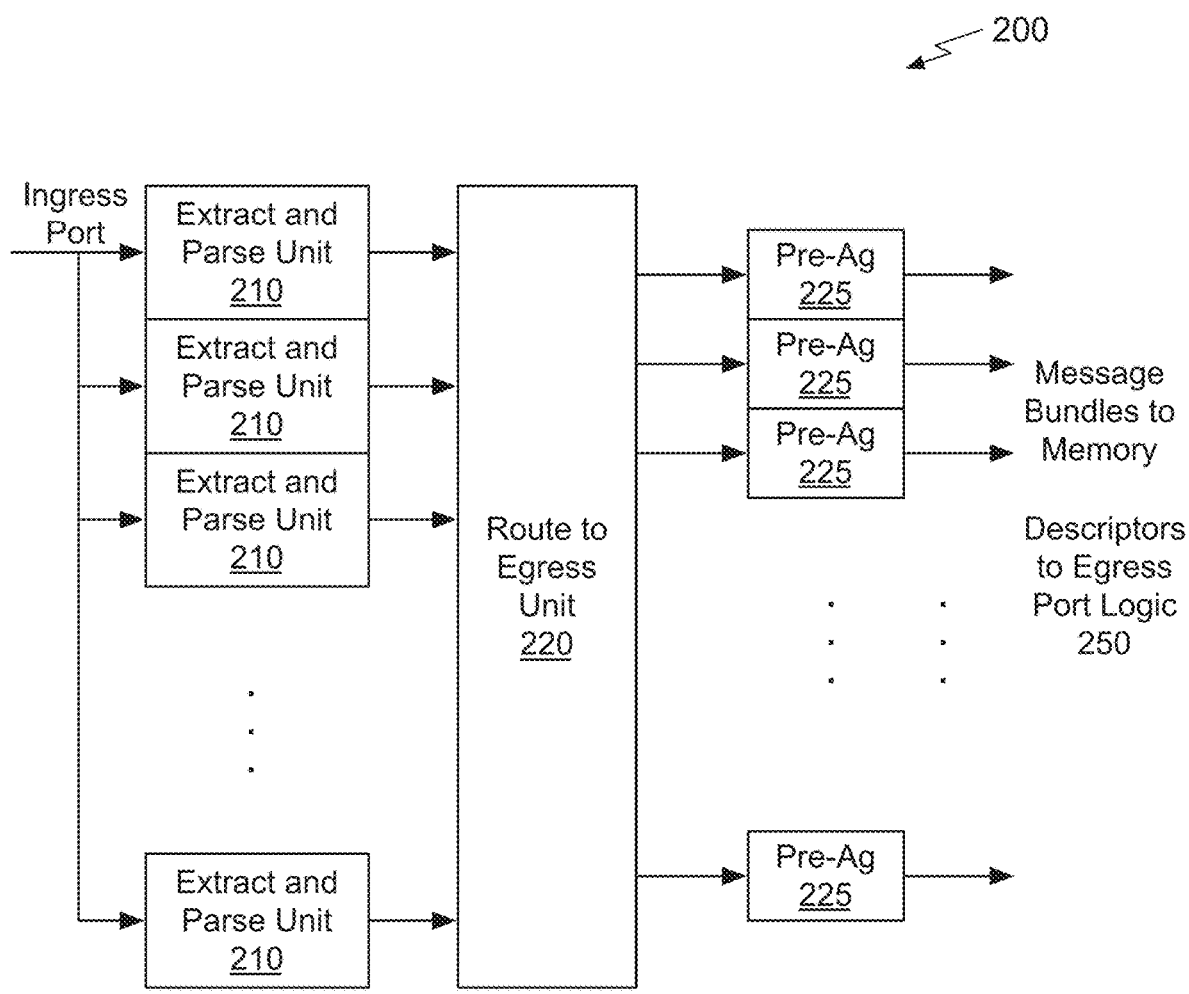
FIG. 2A illustrates a block diagram of ingress port logic suitable for use in implementing some embodiments of the present disclosure.

FIG. 2A illustrates a block diagram of ingress port logic 200 suitable for use in implementing some embodiments of the present disclosure. Multiple extract and parse units 210 are needed to process (buffer, extract, parse) the small messages in parallel so that performance is not reduced compared with processing a single large message. Because the network 125 is internally unordered, the aggregated messages may be processed in parallel. Parallelism enables the extraction of messages as small as 8-bytes at line rate. Although the network 125 is generally unordered, ordering may be re-established at the receiving destination endpoint 140.

The extracted messages are routed to the egress ports (based on the network topology) by route to egress unit 220. In an embodiment, the route to egress unit 220 is a crossbar circuit that provides connections from each one of the extract and parse units 210 to any one of multiple pre-aggregation units 225. In an embodiment, the route to egress unit 220 implements a structure similar to buffers provided in virtual output queuing. Two or more extracted messages routed to the same egress port may be pre-aggregated by the pre-aggregation unit 225 associated with the egress port to produce a message bundle that includes more than a single message. Pre-aggregation ensures that wire efficiency of wide internal data paths within the switch 130 is maintained. In an embodiment, the internal data path is greater than the link bandwidth and circuitry at interfaces of the switch 130 is overclocked. Therefore, combining just two 8-byte messages per write to the memory storage maintains the line-rate processing rate.

The message bundles are then sent to the egress logic. In an embodiment, each message bundle is written to a memory storage (not shown) within the switch 130 and a corresponding descriptor is provided to the egress port. In an embodiment, the descriptor comprises information needed to construct a packet, such as the shared context ID and destination address. In an embodiment, the descriptor comprises a memory address where the packet is written and a length. The egress logic may then fetch the message bundle from the memory storage, construct a packet with aggregated messages, and send the constructed packet to the next hop (either another switch 130 or the destination endpoint 140).

Aggregation buffer sorting at ingress and/or egress can be optimized for the topology of the network. For instance, sorting by groups may be deferred to spine switches while leaf switches can aggregate messages traveling upward toward the spine switches for any destination. As a result, each egress port in the network only needs one aggregation buffer per context. In an example (assuming a canonical two-level Fat-Tree), "sorting" at the spine switch happens automatically by virtue of routing. Spine switches can be randomly chosen by leaf switches in the upstream direction. Once at the spine, each egress port connects to a specific leaf switch (group). Consequently, all messages that are routed to the same egress port can be aggregated (if the messages also share the same context) and there is no need for explicit sorting in the egress logic. Overall, performing the aggregation at the leaf source endpoints 110, leaf destination endpoints 140, and the switches 130 reduces the number of buffers needed at the destination endpoints 140 while also improving bandwidth efficiency for transporting small messages.

Figure 2B:
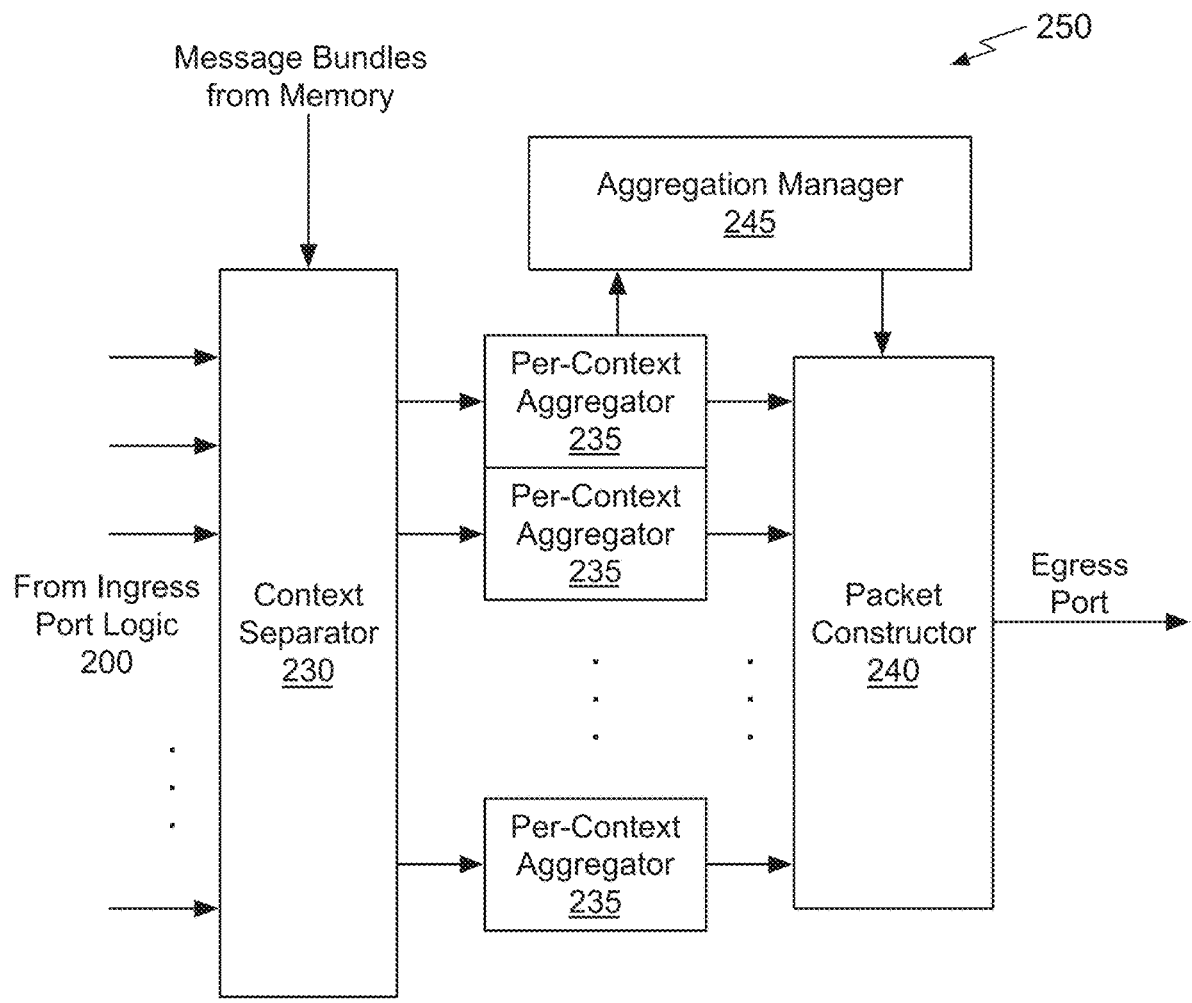
FIG. 2B illustrates a block diagram of egress port logic suitable for use in implementing some embodiments of the present disclosure.

FIG. 2B illustrates a block diagram of egress port logic 250 suitable for use in implementing some embodiments of the present disclosure. The egress port logic 250 for each egress port receives descriptors for message bundles from multiple ingress ports. At the egress port logic 250, the descriptor is processed, and a memory read request is issued to obtain the corresponding message bundle. In an embodiment, every combination of context and next hop requires a unique aggregation buffer, so a context separator 230 directs each of the message bundles to a per-context aggregator 235 based on the context ID encoded in the descriptor for the pre-aggregated messages. The message bundles have already been routed to the egress port associated with the next hop. The per-context aggregators 235 buffer one or more messages before outputting them to a packet constructor 240.

Each egress port only needs one per-context aggregator 235 per active context instead of per destination endpoint 140. Note that applications tend to use only a few contexts at a time, so that the number of active contexts may be ten or fewer while the total number of possible contexts is much larger. In an embodiment, contexts are considered as resources that are managed by a job scheduler. For example, the job scheduler may track used contexts and only schedule jobs that require small message aggregation if the requested number of contexts is available.

In-network aggregation improves bandwidth efficiency at a slight cost in increased packet latency since some messages will need to be held in an aggregation buffer awaiting the opportunity to be aggregated with other same context messages. Various techniques may be used to ensure that messages are not stalled in the per-context aggregators 235 waiting to be output (e.g., workload based, timeout, size) and to ensure that a per-context aggregator 235 is available for a new context. An aggregation manager 245 controls the output of messages by the per-context aggregators 235 based on at least one of a timeout, number of messages (size), and processing load. The packet constructor 240 combines the messages into a packet along with a constructed header and transmits the packet towards the destination endpoint. In an embodiment, a format of the constructed packet is one of the packet formats 155, 160, and 165.

A variety of trigger options exist that cause the aggregation manager 245 to output the contents of a per-context aggregator 235. For example, the maximum amount of packet latency increase could be specified by a user or system administrator. In an embodiment, the aggregation manager 245 outputs the messages for inclusion in a packet if the number of messages exceeds a certain pre-configured threshold or if a pre-configured timer expires. The thresholds may also be set for the maximum number of messages that are aggregated for a particular (or each) context. If a per-context aggregator 235 is not available for a new active context, a packet can be constructed and sent out prematurely to free up resources for the new active context, reducing efficiency only momentarily.

In an embodiment, the threshold and/or timeout may be derived from system conditions. For example, the threshold and/or timeout may be reduced when the processing load is low and increased when the processing load is high. In an embodiment, when a processing load drops below some threshold, the aggregation benefit will become parasitic since latency increases but no message rate or bandwidth starvation problems exist. Similarly, if congestion is observed, it signals an opportunity to extend the temporal aggregation window since packets could not be sent out anyway.

In an embodiment, system condition triggers may be used to avoid the latency overhead of aggregation when it is not needed. However, compared to a software or NIC-only approach, in-network aggregation typically provides greater efficiency. First, software aggregation needs to allocate aggregation buffers for each destination endpoint. In a flat scheme, e.g., one buffer per destination endpoint, a large number of buffers is required in large systems, adding memory and latency for uniform random traffic. Uniform random traffic is the predominant traffic pattern in graph algorithms. Hierarchical software aggregation reduces the effective bandwidth because messages are received just to be aggregated and sent out again. In contrast, for in-network aggregation, each NIC only has one buffer in which it aggregates all messages. The aggregated messages are then sorted in switches 130. While each switch 130 adds aggregation latency, the overall latency is still smaller (up to 50%) at a higher bandwidth (up to 1.4× higher message rates). Additionally, in switches silicon area is dominated by memory while the aggregation logic is small.

Figure 3A:
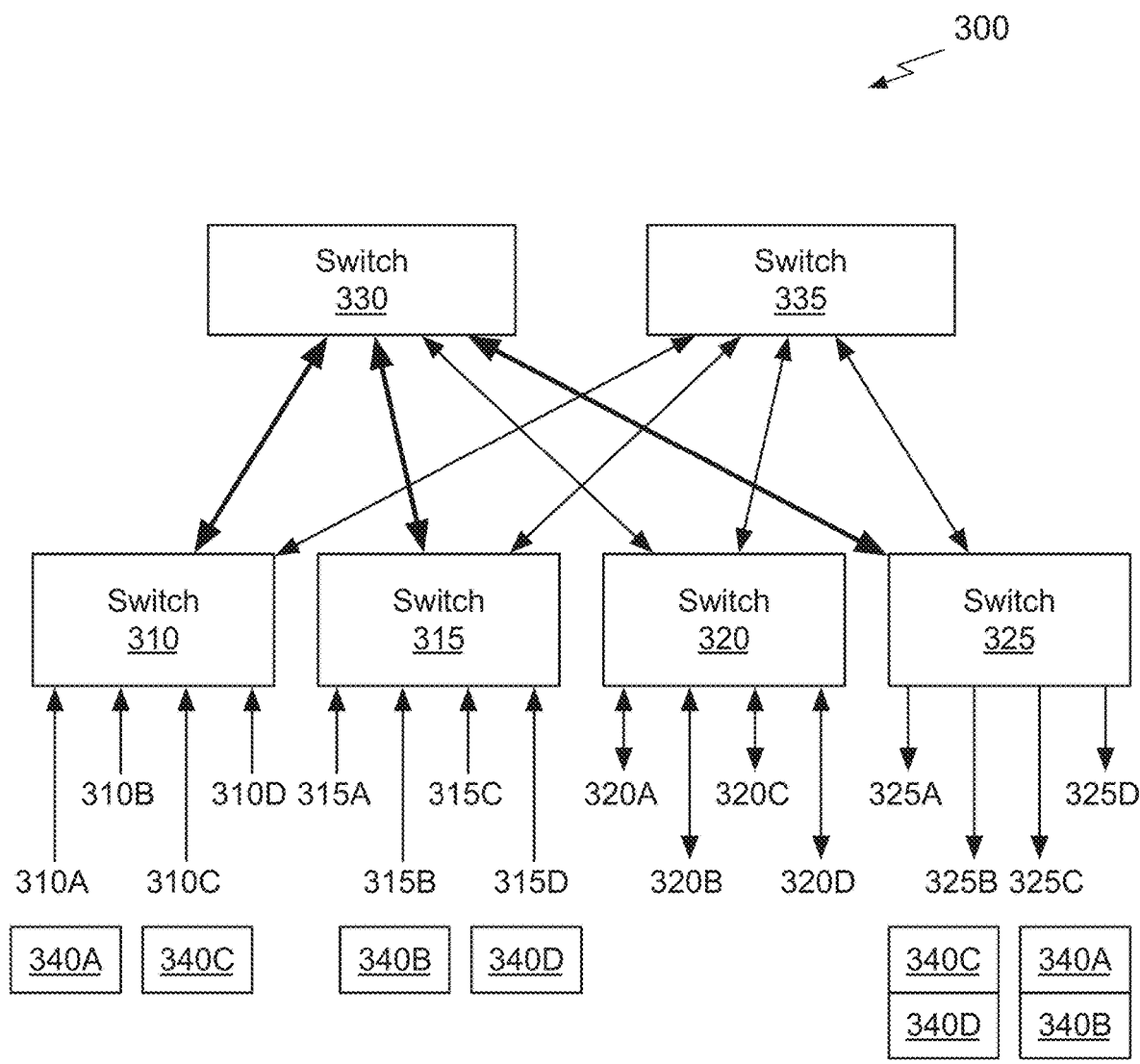
FIG. 3A is a conceptual diagram illustrating hierarchical aggregation suitable for use in implementing some embodiments of the present disclosure.

FIG. 3A conceptual diagram illustrating in-network hierarchical aggregation suitable for use in implementing some embodiments of the present disclosure. A two-level Fat-Tree topology 300 includes a first level of leaf (source and/or destination) switches 310, 315, 320, and 325. The leaf switches 310, 315, 320, and 325 aggregate messages for each context, where messages 340A, 340C, 340B, and 340D are for the same context. Endpoints 315B and 315D send the messages 340B and 340D, respectively, to the leaf switch 315. Endpoints 310A and 310C send the messages 340A and 340C, respectively, to the leaf switch 310. The messages 340C and 340D are routed to the endpoint 325B through the leaf switch 325. The messages 340A and 340B are also routed through the leaf switch 325, but to the endpoint 325C.

The messages 340A and 340C are aggregated into a single packet at the switch 310 and routed to the switch 330. The messages 340B and 340D are aggregated into a single packet at the switch 315 and are also transmitted to the switch 330. In the spine switch 330 the messages 340A, 340C, 340B, and 340D are extracted from their respective packets and aggregated into a single packet that is transmitted to the leaf switch 325. The single packet constructed by the spine switch 330 includes the context ID in the message destination header 156 for each message instead of including the context ID in the common destination header 155.

The leaf switch 325 extracts the messages 340A, 340C, 340B, and 340D from the packet. The leaf switch 325 then transmits messages 340A and 340B to the endpoint 325C. Note that the messages 340A and 340B are aggregated into a single packet at the leaf switch 325 because the messages share the same context. The switch 325 routes the messages 340C and 340D to the endpoint 325B.

It is also important to note that while messages going to the same destination endpoint may be aggregated, the in-network aggregation may also aggregate messages that share the same network route segments (e.g., next hop). For example, if the message 340C were going to the leaf switch 320 instead of the leaf switch 325, the message 340C is still aggregated with the message 340A at the source leaf switch 310 because they share the same path from the source leaf switch 310 to the spine switch 330. Hierarchical aggregation by the leaf and spine switches is an efficiency advantage, especially for random communication patterns. Aggregation hierarchies are purely logical and can be constructed for any physical topology. Bandwidth overhead is further reduced by dividing the routing header into a common destination header and a per-message routing header. In the example of the two-level Fat Tree topology 300, the common destination header 155 indicates the destination leaf switch, while every message would carry a node and process identifier. The per-message destination headers 156 are used by the receiving leaf or spine switch to disaggregate messages and forward each message to its individual destination.

The bandwidth efficiency and potentially message transfer rates are improved by aggregating multiple small payload packets into a single packet with a shared header. When multiple payload packets share the same context, the shared header is smaller than the combined headers of the individual small payload packets. The use of contexts enables greater compression by storing properties that are usually described in separate packet header fields at the endpoints. Contexts are explicitly created and destroyed. Context creation is a collective operation which synchronizes participating endpoints. On creation, the context ID and the properties of packets with the context ID are sent from the source endpoint to the participating destination endpoints. In an embodiment, the context ID and properties are sent to all switches that could be on the route from the source endpoint to any destination endpoint. In an embodiment, information is included in the packet that is needed by the network switches to perform the network and transport layer duties. The context ID is a reference to the context specific packet properties stored in the endpoints and therefore does not need to be included in the individual packets.

Messages with the same context and next hop destination can be aggregated at the leaf switches. In an embodiment, at the spine switches, messages with different contexts that have the same next hop can be aggregated. There are a very large number of contexts that are possible, but at any given time only a small fraction of possible contexts will be concurrently active, such as for Bale applications. The context identifier is a compressed reference to properties, such as the pre-aggregation packet properties, response requirements, and notification mechanisms. The size of the context field containing the context ID can be quite small compared to the size of the fields that would be needed to explicitly specify the properties. When only messages having the same context can be aggregated by the leaf and spine switches, it is guaranteed that all messages that are part of the aggregated packet share the same context, which greatly reduces the overhead, as the context only needs to be transferred once per packet.

The in-network aggregation takes advantage of the nature of communication events in highly parallel applications. A communication event such as a send, receive, put, get, atomic, etc. happens in the application program at a particular location in the code and is usually a call to a communication library which maps the application-level semantics onto the set of commands that are supported by the underlying networking system. The bulk of the execution time in any large parallel program is spent in iterative code blocks. While there are many communication event locations in the code, each individual communication event tends to perform the same operation every iteration with similar or identical characteristics. Namely the source, destination(s), data type, etc. are the same. This creates the opportunity to compose multiple small payload messages into a single larger payload message with a single context header that would normally be copied numerous times on each of the individual small payload messages. In order to be aggregated, the individual source packets need to be marked as aggregable and have the same context. The context includes transport semantics (reliable vs unreliable), notification style, delivery model (at least once, at most once, exactly once), ordered vs. unordered, etc.

Figure 3B:
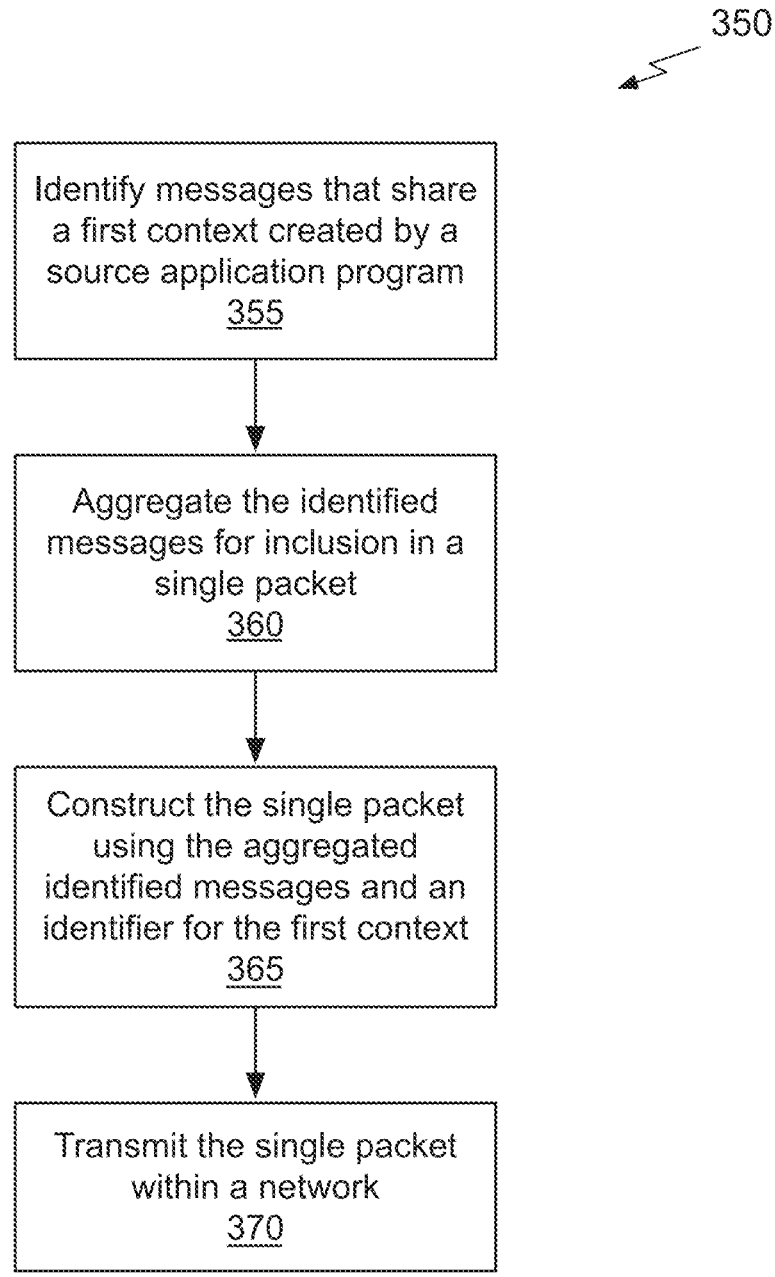
FIG. 3B illustrates a flowchart of a method for aggregating messages, in accordance with an embodiment.

FIG. 3B illustrates a flowchart of a method 350 for aggregating messages, in accordance with an embodiment. Each block of method 350, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 350 is described, by way of example, with respect to the system 100 of FIG. 1A. However, this method may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 355, messages that share a context created by a source application program are identified. In an embodiment, ingress port logic 200 in the switch 130 identifies received messages that share the context. In an embodiment, the context is an active context of a plurality of contexts. In an embodiment, the identified messages are combined into a message bundle. At step 365, the identified messages are aggregated for inclusion in a single packet. In an embodiment, egress port logic 250 in the switch 130 aggregates one or more of the message bundles that share the context into one or more packets.

At step 365, the single packet is constructed using the aggregated identified messages and an identifier for the context. In an embodiment, constructing the single packet comprises encoding a common portion of a destination endpoint for the aggregated identified messages into the single packet. In an embodiment, constructing the single packet comprises encoding a common portion of a destination endpoint for the aggregated identified messages into the single packet. In an embodiment, constructing the single packet comprises encoding a next hop for the aggregated identified messages into the single packet. In an embodiment, constructing the single packet further comprises encoding message-specific portions of destination endpoints for the aggregated identified messages into the single packet.

At step 370, the single packet is transmitted within a network. In an embodiment, at least one of the identified messages is received at a destination endpoint within the network and the destination endpoint accesses properties for the context using the identifier. In an embodiment the properties are read from the context table 120 at the destination endpoint 140. In an embodiment, the source application program stores the properties for the context at the destination endpoint. In an embodiment, the source application process 105 stores the properties for the context in the context table 120 at one or more participating endpoints, including the destination endpoint 140. In an embodiment, the properties comprise at least one of properties of packets, response requirements, and notification mechanisms. In an embodiment, at least a portion of the properties are endpoint specific, such as the number of processes in the collective, the location and types of buffers or queues where the message will be stored on the receiver side. In an embodiment, at least a portion of the properties are network agnostic but allow the receiving endpoint to interpret the packet payload correctly (e.g., specify attributes associated with reliability, ordering, atomicity, data type, etc.)

In an embodiment, a switch within the network extracts a first message and a second message of the aggregated identified messages from the packet, transmits the first message to a first destination, and transmits the second message to a second destination. In an embodiment, the first message is aggregated with other messages received at the switch and included in another packet. In an embodiment, the single packet is transmitted in response to determining that either a timer expired or a maximum number of the identified messages are aggregated. In an embodiment, at least one of the timer and the maximum number is adjusted as a processing workload changes. In an embodiment, the maximum number corresponds to the context and a second maximum number corresponds to an additional context. In an embodiment, the single packet is constructed in response to determining that an aggregation buffer (e.g., per-context aggregator 235) is not available for a second context.

In an embodiment, at least one of the steps of 355, 360, and 365 is performed on a server or in a data center to generate content that is streamed to a user device. In an embodiment, at least one of the steps of 355, 360, and 365 is performed within a cloud computing environment. In an embodiment, at least one of the steps of 355, 360, and 365 is performed for training, testing, or certifying a neural network employed in a machine, robot, or autonomous vehicle. In an embodiment, at least one of the steps of 355, 360, and 365 is performed on a virtual machine comprising a portion of a graphics processing unit.

In an embodiment, in-network aggregation is implemented in high-performance compute clusters where the number of network endpoints is more on the scale of thousands. NVLink is an example of a specialized network protocol designed for high performance clusters where the applications exhibit very high levels of parallelism and communication. For 8-byte payloads, the bandwidth efficiency of the packet format 150 would only be 20%. This low bandwidth efficiency will quickly lead to performance limiting network saturation under high network load since 80% of the available bandwidth is consumed by overhead. In-network aggregation may improve bandwidth efficiency by a factor of 3-4 with only a moderate increase in latency.

In particular, in-network aggregation improves the performance of modern applications, where insufficient network bandwidth and/or message rate is the performance bottleneck. Examples are sparse linear algebra and distributed graph algorithms. In each of these cases, the size of the input data set is too large to reside on a single node. The data must be fragmented and stored in distributed locations. The computational need to access remote data results in high frequency communication, and in many cases the payload might be a simple 8-byte address (read request) or a single 8-byte data word (read response). Note that some applications exhibit random communication patterns and are latency tolerant, but greatly benefit from the significantly higher bandwidth provided by in-network aggregation. Overall, in-network aggregation improves performance even further and allows for a simpler programming interface.

Figure 4A:
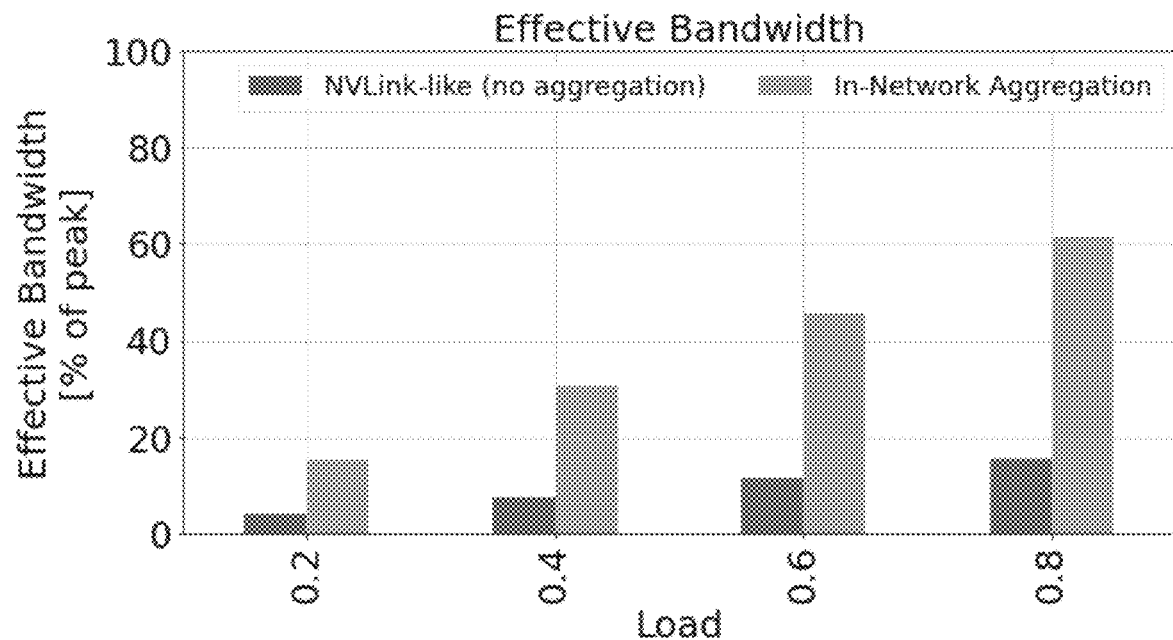
FIG. 4A illustrates simulation projections for effective bandwidth using in-network aggregation, in accordance with an embodiment.

FIG. 4A illustrates simulation projections for effective bandwidth using in-network aggregation, in accordance with an embodiment. The simulations are based on 8-byte messages on a 512-node, two-level Fat Tree, radix-32 switches, uniform random traffic, and an MTU (Maximum Transfer Unit) of 288 bytes. Bandwidth efficiency is proportional to the number of same-context messages we can aggregate, which depends on the spatial and temporal locality of messages. For example, nodes that inject messages to the same destination must share a path in the network, but messages also need to arrive within a certain time window. Higher bandwidth is better and the effective bandwidth increases as the processing load (horizontal axis) increases. Bandwidth efficiency is up to three times higher for the in-network aggregation than for non-aggregated NVLink-like packets and 8-byte messages.

Figure 4B:
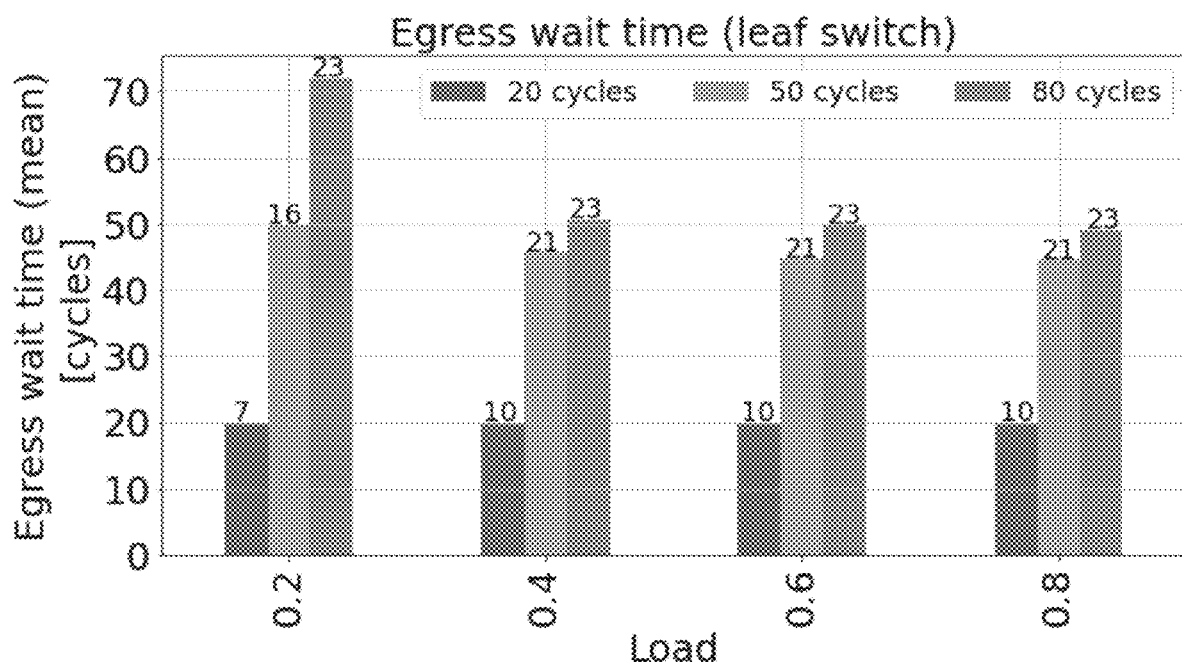
FIG. 4B illustrates simulation projections for egress wait time using in-network aggregation, in accordance with an embodiment.

FIG. 4B illustrates simulation projections for egress wait time using in-network aggregation, in accordance with an embodiment. The graph shows egress aggregation latency per switch for various wait time thresholds (lower is better). The numbers on top of the bars correspond to the mean number of aggregated messages (higher is better). The number of aggregated messages is high at every aggregation point, with an average of 21 messages to be aggregated at every egress port. The aggregated messages produce almost MTU-sized packets on any given link.

FIG. 4B also shows the wait time at egress for various thresholds (20, 40, and 80 cycles). Under moderate load a threshold of 50 cycles is sufficient to yield an average of 21 messages aggregated. The wait time is added at every switch hop. Assuming a switch latency of 200 cycles, the wait time adds 25% to the latency but yields three times higher effective bandwidth. An adaptive approach could lower the latency under low load.

The in-network aggregation comprises several features that improve bandwidth efficiency. The use of a connection-based context scheme that requires an explicit and collective context create and destroy operation enables per-context aggregation of payloads into a single packet. A unique context ID is a reference to the context properties, such as details of the packet transport properties that are stored in the endpoints, so that only the context ID need be included in each constructed packet. The routing headers are compressed by dividing the routing headers into a header 151, common destination header 155, and per-message routing headers (message destination headers 156). Compared with native single payload context-free packets, the combined header 151, common destination header 155, and message destination headers 156 contain a compressed form of the header information. Additionally, aggregation can happen at the source endpoint or at any switch in the path from context packet source to destination. Aggregation may be performed in a hierarchical fashion in the network. The concept of a common destination is generalized to mean routed on the same egress port for network components. Further discrimination at the endpoints is achieved using the context table 120. These features significantly enhance bandwidth efficiency and improve network performance for small payload packets in situations where network performance is bandwidth limited.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
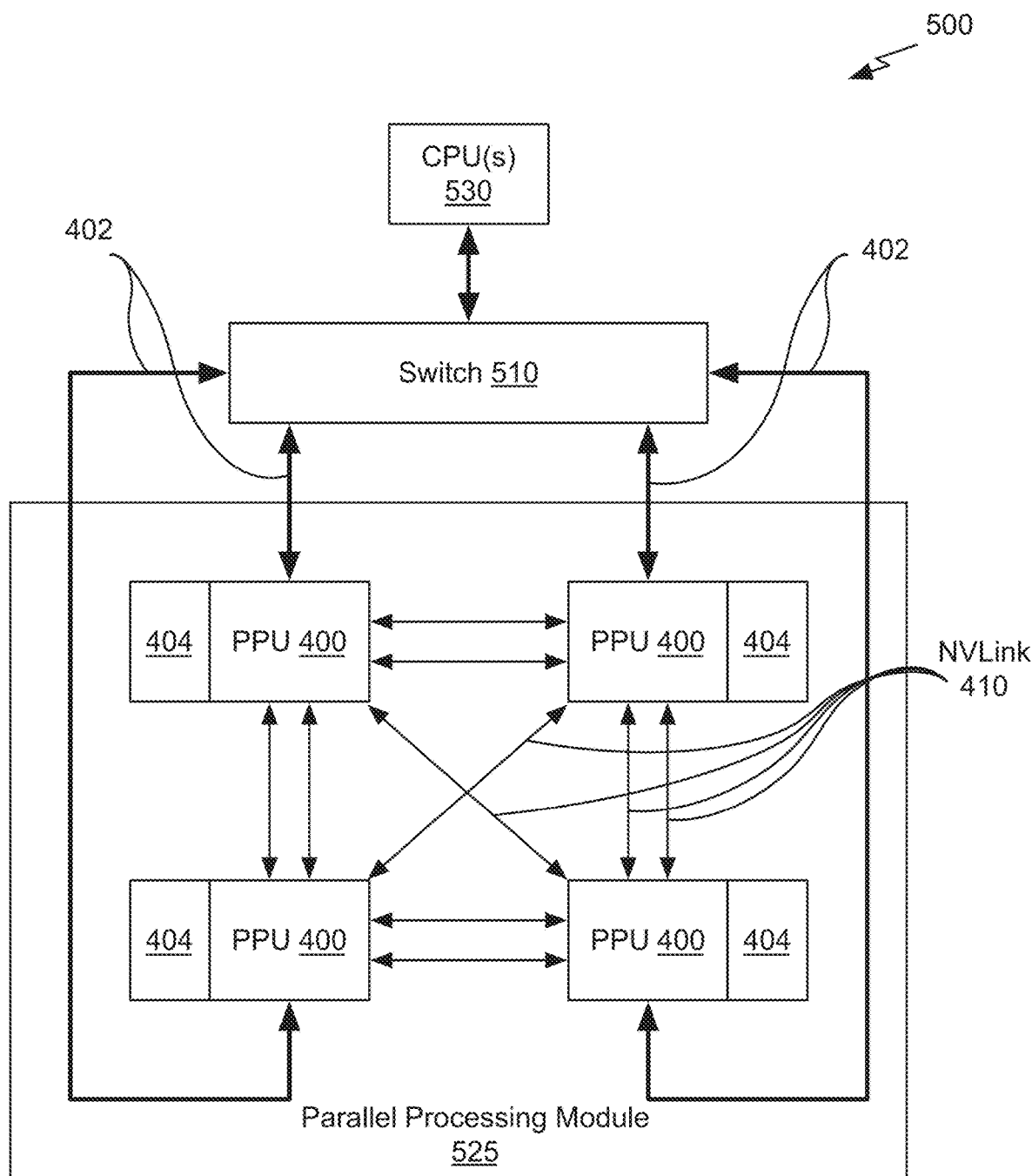
FIG. 5A is a conceptual diagram of a processing system, suitable for use in implementing some embodiments of the present disclosure.

FIG. 5A is a conceptual diagram of a processing system 500, in accordance with an embodiment. The exemplary system 500 may be configured to implement the method 350 shown in FIG. 3B. The processing system 500 includes a CPU 530, switch 510, and multiple parallel processing units (PPU) 400, and respective memories 404. The PPU 400 may be used for in-network message aggregation for efficient small message transport, in accordance with an embodiment. The PPU 400 may be used to implement the system 100.

Each PPU 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPGPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Figure 5B:
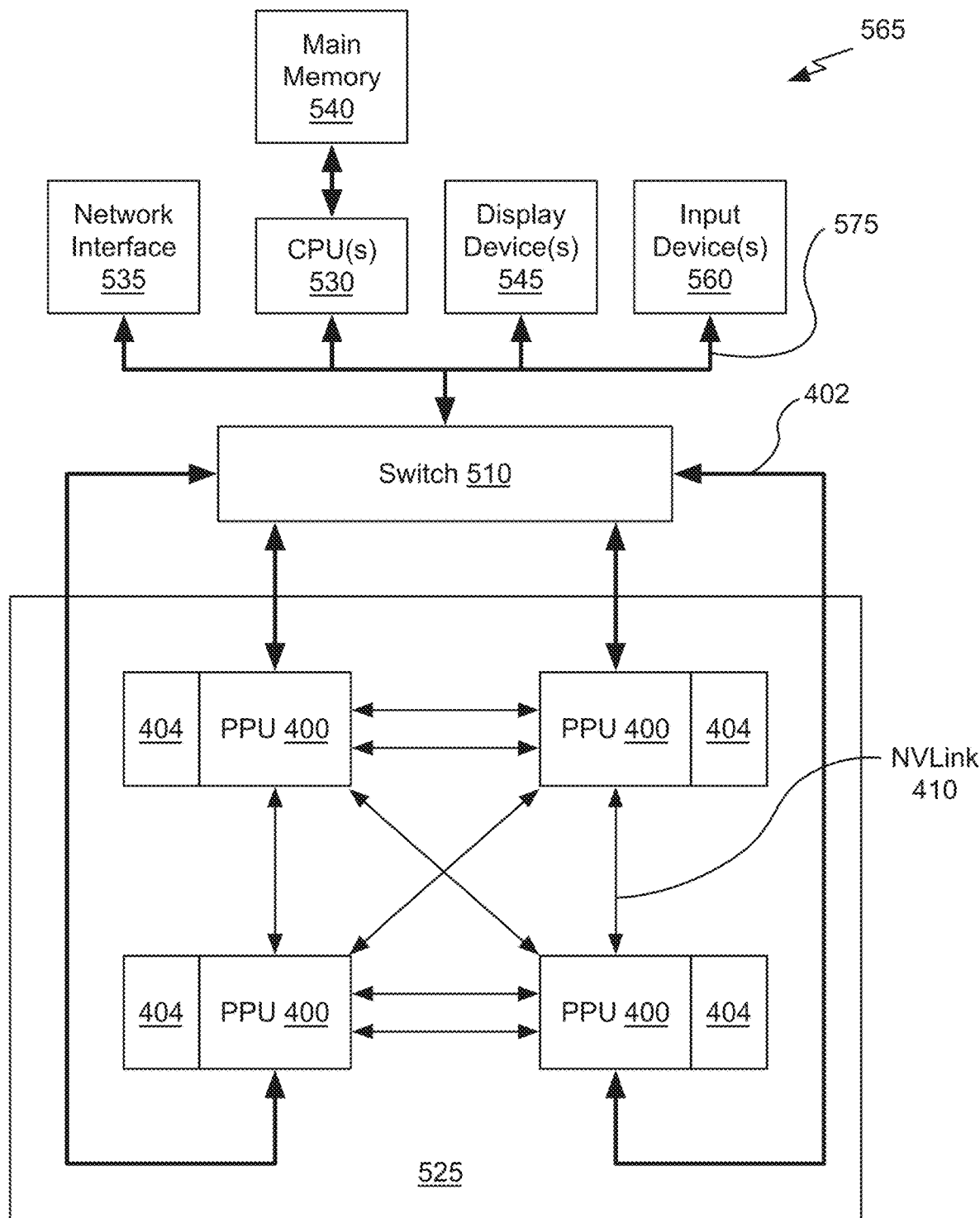
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 350 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
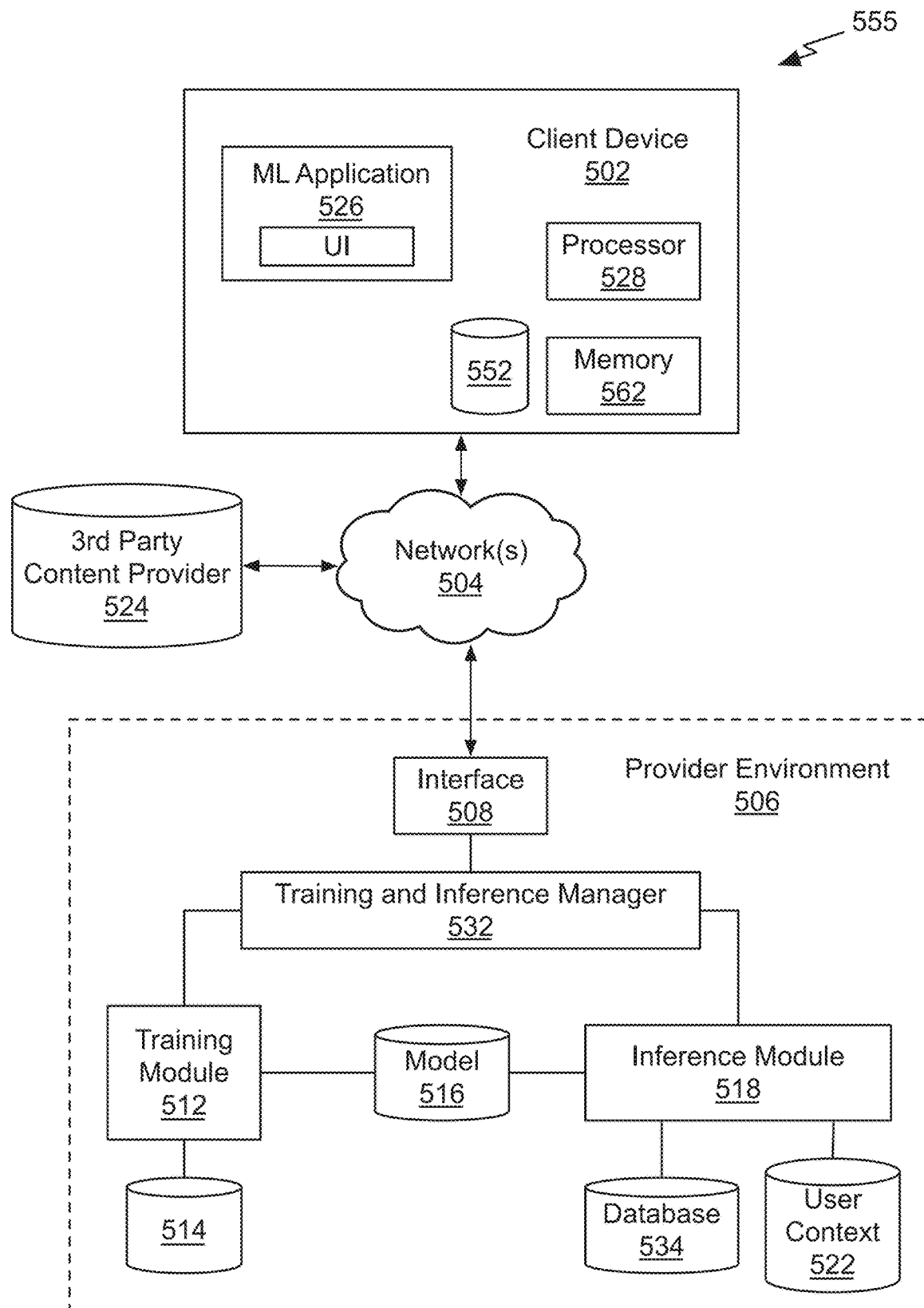
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
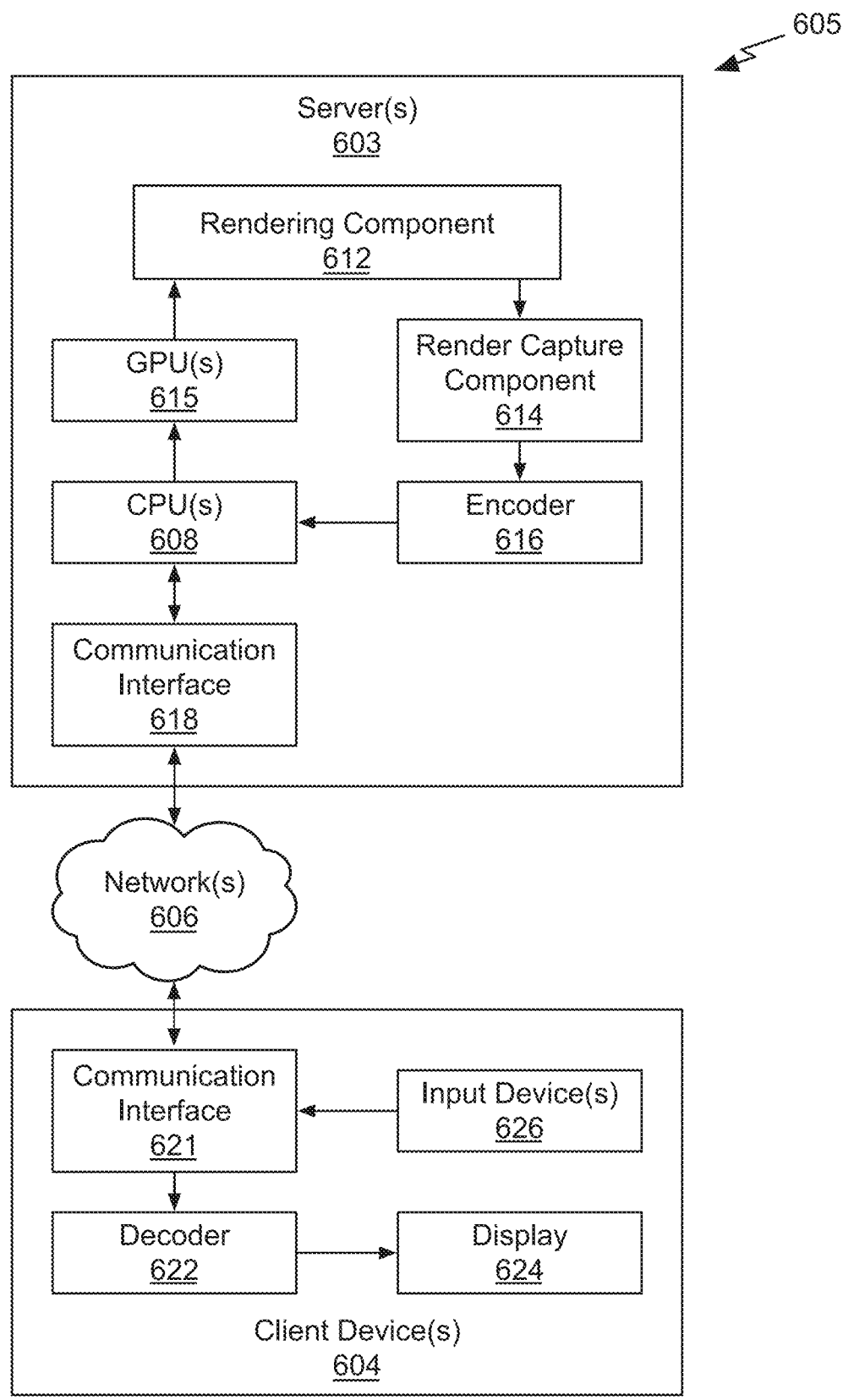
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
identifying messages that share a context created by a source application program;
aggregating the identified messages for inclusion in a single packet;
constructing the single packet including the aggregated identified messages and an identifier for the context, wherein the identifier references properties needed by a destination endpoint to interpret at least one of the identified messages in the single packet and the properties are stored, by the source application program, at each destination endpoint that participates in the context;
extracting, at a switch within a network, a first message and a second message of the aggregated identified messages from the single packet, wherein the properties are irrelevant for routing the single packet through the switch;
transmitting the first message and the identifier towards a first destination endpoint; and
transmitting the second message and the identifier towards a second destination endpoint.

2. The computer-implemented method of claim 1, further comprising:
receiving the first message at the first destination endpoint; and
using the identifier, accessing the properties stored in a table within the first destination endpoint.

3. The computer-implemented method of claim 1, wherein the properties comprise at least one of properties of packets, response requirements, or notification mechanisms.

4. The computer-implemented method of claim 1, wherein the properties comprise at least one of a number of processes in a collective, a location where at least one of the identified messages will be stored, or attributes associated with reliability, ordering, atomicity, or data type.

5. The computer-implemented method of claim 1, wherein the first message is aggregated with other messages identified as sharing the context and included in a second packet constructed at the switch.

6. The computer-implemented method of claim 1, wherein the single packet is constructed in response to determining that either a timer expired or a maximum number of the identified messages are aggregated.

7. The computer-implemented method of claim 6, wherein at least one of the timer and the maximum number is adjusted as a processing workload changes.

8. The computer-implemented method of claim 6, wherein the maximum number corresponds to the context and a second maximum number corresponds to an additional context.

9. The computer-implemented method of claim 1, wherein the single packet is constructed in response to determining that an aggregation buffer is not available for an additional context.

10. The computer-implemented method of claim 1, wherein constructing the single packet comprises encoding a common portion of addresses of destination endpoints for the aggregated identified messages into the single packet.

11. The computer-implemented method of claim 10, wherein constructing the single packet further comprises encoding message-specific portions of the addresses of the destination endpoints for the aggregated identified messages into the single packet.

12. The computer-implemented method of claim 1, wherein constructing the single packet comprises encoding a next hop for the aggregated identified messages into the single packet.

13. The computer-implemented method of claim 1, wherein at least one of the steps of identifying, aggregating, and constructing is performed on a server or in a data center to generate content that is streamed to a user device.

14. The computer-implemented method of claim 1, wherein at least one of the steps of identifying, aggregating, and constructing is performed within a cloud computing environment.

15. The computer-implemented method of claim 1, wherein at least one of the steps of identifying, aggregating, and constructing is performed for training, testing, or certifying a neural network employed in a machine, robot, or autonomous vehicle.

16. The computer-implemented method of claim 1, wherein at least one of the steps of identifying, aggregating, and constructing is performed on a virtual machine comprising a portion of a graphics processing unit.

17. A system, comprising:
a processor that is connected to a network, wherein the processor executes a source application program that creates a context;
a device within the network that is configured to:
identify messages that share the context;
aggregate the identified messages for inclusion in a single packet;
construct the single packet including the aggregated identified messages and an identifier for the context, wherein the identifier references properties needed by a destination endpoint to interpret at least one of the identified messages in the single packet and the properties are stored, by the source application program, at each destination endpoint that participates in the context;
extract, at a switch within a network, a first message and a second message of the aggregated identified messages from the single packet, wherein the properties are irrelevant for routing the single packet through the switch;
transmit the first message and the identifier towards a first destination endpoint; and
transmit the second message and the identifier towards a second destination endpoint.

18. The system of claim 17, wherein the first destination endpoint is further configured to:
receive the first message; and
using the identifier, access the properties stored in a table within the first destination endpoint.

19. A non-transitory computer-readable media storing computer instructions that, when executed by one or more processors, cause the one or more processors to perform the steps of:
identifying messages that share a context created by a source application program;

aggregating the identified messages for inclusion in a single packet;

constructing the single packet including the aggregated identified messages and an identifier for the context, wherein the identifier references properties needed by a destination endpoint to interpret at least one of the identified messages in the single packet and the properties are stored, by the source application program, at each destination endpoint that participates in the context;

extracting, at a switch within a network, a first message and a second message of the aggregated identified messages from the single packet, wherein the properties are irrelevant for routing the single packet through the switch;

transmitting the first message and the identifier towards a first destination endpoint; and transmitting the second message and the identifier towards a second destination endpoint.

20. A computer-implemented method for operation of a device connected to a network, wherein a plurality of source endpoints and a plurality of destination endpoints are coupled to the network, and wherein a message includes a payload that is associated with a context of one or more contexts created by a source application program, and wherein the method comprises:

identifying messages that share a first context;

aggregating into a packet the identified messages and a context identifier corresponding to the first context, wherein the identifier references properties needed by a destination endpoint to interpret at least one of the identified messages in the single packet and the properties are stored, by the source application program, at each destination endpoint of the plurality of destination endpoints that participates in the context;

extracting, at a switch within a network, a first message and a second message of the aggregated identified messages from the single packet, wherein the properties are irrelevant for routing the single packet through the switch;

transmitting the first message and the identifier towards a first destination endpoint; and transmitting the second message and the identifier towards a second destination endpoint.

21. A computer-implemented method of claim 20, wherein the packet includes a common portion of addresses of each destination endpoint of the plurality of destination endpoints associated with the identified messages and message-specific portions of the addresses of each destination endpoint of the plurality of destination endpoints associated with the identified messages.

* * * * *